United States Patent [19]
Bloom et al.

[11] 3,709,693
[45] Jan. 9, 1973

[54] NOVEL PHOTOGRAPHIC PRODUCTS AND PROCESSES UTILIZING MULTICOLOR ADDITIVE SCREENS WHOSE FILTER UNITS ARE FORMED OF DEVELOPMENT-DIFFUSIBLE DYES

[75] Inventors: Stanley M. Bloom, Waban; Leonard C. Farney, Melrose, both of Mass.

[73] Assignee: Polaroid Corporation, Cambridge, Mass.

[22] Filed: April 26, 1971

[21] Appl. No.: 137,487

[52] U.S. Cl. ............................96/118, 96/3, 96/25, 96/26, 96/29 D, 96/77
[51] Int. Cl. ..........G03c 5/54, G03c 7/04, G03c 7/14
[58] Field of Search.........96/3, 29 D, 24, 25, 26, 118

[56] References Cited

UNITED STATES PATENTS

| | | | |
|---|---|---|---|
| 2,968,554 | 1/1961 | Land | 96/3 |
| 3,443,939 | 5/1969 | Bloom et al. | 96/3 |
| 3,443,940 | 5/1969 | Bloom et al. | 96/3 |
| 3,443,943 | 5/1969 | Rogers et al. | 96/29 D |

Primary Examiner—J. Travis Brown
Assistant Examiner—Alfonso T. Suro Pico
Attorney—Brown and Mikulka, Robert M. Ford and Philip G. Kiely

[57] ABSTRACT

A color image is formed by exposing a photosensitive element having associated therewith an additive color screen, preferably a trichromatic color screen, composed of red, green and blue filter elements containing dyes which provide the required spectral absorption and transmission characteristics and which are diffusible in processing composition as a function of exposure, whereby an imagewise distribution of dyes and complexed silver is transferred by imbibition to an adjacent layer to provide, when viewed by projection, an additive color image.

24 Claims, 3 Drawing Figures

INVENTORS
STANLEY M. BLOOM
and
LEONARD C. FARNEY
BY Brown and Mikulka
and
Philip G. Kiely
ATTORNEYS

NOVEL PHOTOGRAPHIC PRODUCTS AND PROCESSES UTILIZING MULTICOLOR ADDITIVE SCREENS WHOSE FILTER UNITS ARE FORMED OF DEVELOPMENT-DIFFUSIBLE DYES

BACKGROUND OF THE INVENTION

Many systems are known for preparing color images by diffusion transfer. In such prior systems, for example, a photosensitive element containing at least one light-sensitive silver halide emulsion and associated layer of color-providing material, e.g., a complete dye or a color coupler, is exposed and then developed to provide, as a function of development, an imagewise distribution of color-providing material which is transferred, by imbibition, to a superposed image-receiving element, e.g., a dyeable sheet material, to provide thereon a monochromatic or multicolor image of the original subject matter. Many of these prior systems rely for color transfer image formation upon mechanisms for providing, as a function of development, a differential in mobility or diffusibility in the processing fluid of the color-providing material.

Various systems have also heretofore been suggested wherein the color-providing material contains an anchoring moiety or ballast, rendering this material immobile or non-diffusible and the chemistry of reaction as a function of development is such that the color-providing moiety is separated from the anchoring moiety so that it is free to transfer to the image-receiving element to form a color transfer system.

The present invention involves various new systems and procedures of the foregoing description utilizing compounds including a color-providing moiety which is arranged in an additive color screen configuration and transfers, as a function of exposure and development, thereby providing an imagewise differential of transferable color-providing material.

SUMMARY OF THE INVENTION

The novel film unit of the present invention is composed of a photosensitive silver halide emulsion having associated therewith an additive multicolor screen wherein the color screen is composed of dyes which are normally non-diffusible as disposed in the film unit, but which possess a differential in mobility or diffusibility as a function of exposure and development.

In one embodiment, the emulsion is exposed through the color screen and then contacted with a developing composition which includes a silver solvent and a developer capable of forming an oxidation product upon contact with the exposed silver halide. The thus-formed oxidation product will contact the dyes in that portion of the color raster substantially immediately contiguous thereto thereby releasing color-providing material from said color raster which transfers to an adjacent dyeable image-receiving layer. Simultaneously, the silver solvent dissolves unexposed silver halide which diffuses to an adjacent layer containing silver precipitating nuclei. Preferably, a single receiving layer is employed which contains both mordant sites for the dyes which are transferred and silver precipitation nuclei for the transferred silver.

Thus, by means of the novel process of the present invention, a multicolor negative image is formed on the image-receiving layer, which by projection, provides a positive image by additive color synthesis, with the dyes deposited therein providing the primary colors and the transferred, and reduced silver providing the black record; i.e., the silver is the modulator for the dyes.

DETAILED DESCRIPTION OF THE INVENTION

Figure 1:
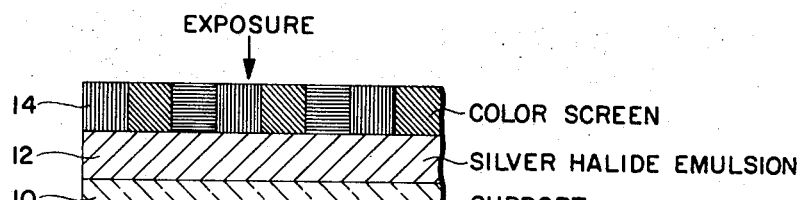
FIG. 1 is an enlarged fragmentary sectional view illustrating one embodiment of the photosensitive element of the present invention.

According to one embodiment of the present invention, a photosensitive element is provided which comprises a panchromatically sensitized silver halide emulsion having associated therewith an additive color screen wherein the dyes employed to form the color screen are compounds which are substantially immobile and nondiffusing in the film unit and in the processing composition but which, upon exposure and development, undergo a reaction which renders at least the chromophore of the compound mobile and diffusible. The color image is formed by the transfer of such imagewise mobile moieties to an adjacent image-receiving layer. Simultaneously with the point-to-point transfer of the mobile dyes of the color screen, a point-to-point transfer of silver halide is also effected from areas of low exposure or unexposed areas to the superposed image-receiving layer to produce a silver imagewise deposit thereon. Thus, the image-receiving layers employed would be both dyeable to accept and retain the diffusible dyes, preferably containing mordant sites therein, and also contain silver nucleating sites so that a color image and a reduced silver image can be formed therein. Thus, a single layer could incorporate both the mordant and silver precipitating nuclei or two separating layers could be employed; one to receive the silver and one to receive the dye.

In the operation of the present invention, a photosensitive element composed of a panchromatically sensitized silver halide emulsion having an additive color screen associated therewith wherein the dyes forming the color screen are composed of normally nondiffusing and immobile dyes in the film unit and in the processing composition, is given an imagewise exposure through the color screen. The additive color screen is formed of a filter media composed of the aforementioned ballasted or nondiffusing dye compounds of selected radiation modulating characteristics. Thus, the screen effects selective filtration of predetermined portions of the visual electromagnetic spectrum substantially corresponding to its red, blue and green regions and color information recordation is accomplished by point-to-point incidence of radiation actinic to the underlying photosensitive silver halide emulsion as modulated by such screen element.

The degree of exposure of the underlying silver halide is determined by the character and intensity of light transmitted by the portion of the screen lying directly over the given grains of silver halide.

The exposed photosensitive element is then contacted with a processing composition adapted to coact with only the exposed silver halide to release the immobile or ballasted dye compound associated with the exposed silver halide. The released dye is transferred on a point-to-point basis to a superposed dyeable layer where it forms a negative color transfer image in terms of brightness and a positive in terms of color rendition. Where there has been maximum exposure of the color screen (and underlying silver halide), there is corresponding maximum dye concentration on the receiving sheet.

Simultaneously with the formation of the desired color image, the silver halide is transferred in inverse relationship to exposure by means of a silver solvent in the processing composition to the adjacent image-receiving layer which preferably contains silver precipitating nuclei wherein a positive silver image of neutral density is formed.

Thus, in the present invention, the additive color screen initially performs the conventional function of an additive color screen, i.e., selectively transmitting predetermined portions of the incident electromagnetic radiation spectrum's visible segment to the underlying photoresponsive silver halide emulsion. Subsequent to exposure and development, the screen serves to provide the color image-forming materials which transfer imagewise as a function of exposure to the superposed image-receiving layer. In the present invention, the color formed in the dyeable layer must be the same as that found in the screen.

The photoresponsive layer employed in the present invention is a conventional panchromatically sensitized silver halide emulsion layer known to the art, e.g., a pan-sensitized silver iodobromide gelatino emulsion.

The preferred silver halide type photographic emulsion employed for the fabrication of the photographic film unit, may be prepared by reacting a water-soluble silver salt, such as silver nitrate with at least one water-soluble halide, such as ammonium, potassium or sodium bromide, preferably together with a corresponding iodide, in an aqueous solution of a peptizing agent such as colloidal gelatin solution; digesting the dispersion at an elevated temperature, to provide increased crystal growth; washing the resultant dispersion to remove undesirable reaction products and residual water-soluble salts, for example, employing the preferred gelatin matrix material, by chilling the dispersion, noodling the set dispersion, and washing the noodles with cold water, or alternatively, employing any of the various flocc systems, or procedures, adapted to effect removal of undesired components, for example, the procedures described in U. S. Pat. No. 3,614,928; 2,614,929; 2,728,662, and the like; after-ripening the dispersion at an elevated temperature in combination with the addition of gelatin or such other polymeric material as may be desired and various adjuncts, for example, chemical sensitizing agents and the like; all according to the traditional procedures of the art, as described in Neblette, C. B., *Photography—Its Materials And Processes*, 6th Ed., 1962.

Optical sensitization and preferably panchromatic sensitization of the emulsion's silver halide crystals may then be accomplished by contact with optical sensitizing dye or dyes; all according to the traditional procedures of the art, or described in Hamer, F. M., *The Cyanine Dyes And Related Compounds*.

Subsequent to optical sensitization, any further desired additives, such as coating aids and the like, may be incorporated in the emulsion and the mixture coated on the screen according to the conventional photographic emulsion coating procedures known in the art.

As the binder for the photoresponsive material, the aforementioned gelatin may be, in whole or in part, replaced with some other natural and/or synthetic polymeric material such as albumin; casein; or zein; or resins such as a cellulose derivative, as described in U. S. Pat. Nos. 2,322,085 and 2,541,474; vinyl polymers such as described in U. S. Pat. Nos. 2,253,078; 2,276,322; 2,276,323; 2,281,703; 2,310,223; 2,311,058; 2,311,059; 2,414,208; 2,461,023; 2,484,456; 2,538,257; 2,579,016; 2,614,931; 2,624,674; 2,632,704; 2,642,420; 2,678,884; 2,691,582; 2,725,296; 2,753,264; and the like.

The additive color screen is prepared by conventional methods which will be discussed in greater detail below. In one embodiment, the dyes employed in the screen are initially nondiffusing, e.g., they are compounds which include a color-providing moiety and a ballast or anchoring moiety wherein the color-providing moiety is adapted to transfer as a function of development of the underlying silver halide. Particularly preferred dyes are those which upon oxidation release a colored moiety. As examples of such compounds are those which are capable of reacting with an oxidized developer or which are capable of providing an oxidation product which may react intramolecularly in such a way as to form a new heterocyclic ring and, as a function of such reaction, to split off a mobile and diffusible color-providing material which will then migrate to the image-receiving layer. Such compounds are disclosed and claimed in U. S. Pat. Nos. 3,443,939; 3,443,940; and 3,443,943.

The processing composition contains a silver halide solvent and a silver halide developing agent whose oxidation product is capable of reacting with the ballasted dye in the screen to form the diffusible moiety. For example, in the processes set forth in the aforementioned U.S. Pat. Nos. 3,443,939; 3,443,940; and 3,443,943, the developing agents disclosed therein are capable of providing an oxidation product for reaction with the dye.

The processing composition may include additional reagents performing specific desired functions, e.g., viscous film-forming reagents such as hydroxyethyl cellulose, sodium carboxymethyl cellulose, etc., antifoggants, etc., it being understood that some of these ingredients may be present initially in the film unit, in which case the processing composition containing the developer, alkaline material, silver solvent, etc., is formed by contacting the film unit with the aqueous medium therefor. In any event, the processing composition may, if desired, be confined in a frangible container or "pod" such as described, for example, in U. S. Pat. Nos. 2,543,181; 2,634,886; 2,653,732; 2,674,532; 2,702,146; 2,723,051; 2,750,075; 2,093,829; 3,056,491; and 3,056,492.

In an alternative embodiment the developing agents can be incorporated directly into a layer in the photosensitive element so that they will become actuated upon contact with the aqueous alkaline composition.

Figure 3:
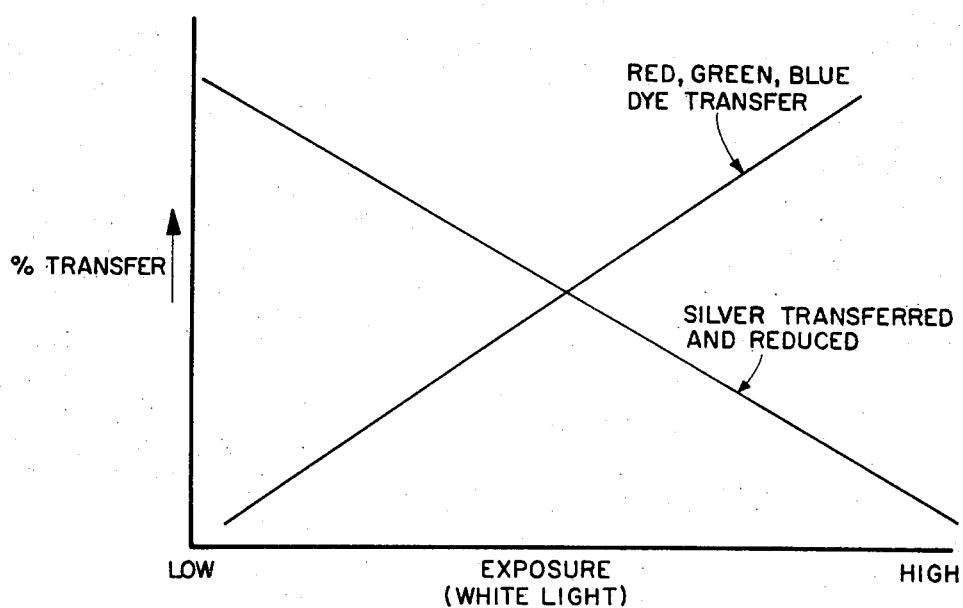
FIG. 3 is a graphic representation of the transfer characteristics of the dyes and silver halide from the photosensitive element.

Thus, in the process of the present invention, two images are formed simultaneously on the image-receiving layer; a multicolor dye image and a positive silver image. The transfer characteristics of each entity are inversely proportional to each other with respect to exposure. FIG. 3 illustrates the transfer characteristics graphically. For simplicity, white light is employed as the exposing actinic radiation. The graph shows that dye transfer, i.e., dye release from the color screen, is directly proportional to exposure since the greater the degree of exposure, the greater quantity of exposed silver halide which in turn triggers the dye release mechanism. As degree of exposure increases, less unexposed silver halide will be available to transfer. Low exposure results in a greater quantity of unexposed silver halide available to be solubilized and transferred by the silver solvent.

FIG. 1 illustrates one embodiment of a photosensitive element of the present invention. Flexible film base or support 10 carries on one surface, in order, panchromatically sensitized silver halide emulsion layer 12 and additive color screen 14, comprising a geometrically repetitive plurality of actinic radiation-filtering colored elements including a set or group of primary red-colored filter elements, a set of primary blue-colored filter elements, a set of primary green-colored filter elements arranged in a repetitive distribution in side-by-side relationship in a substantially single plane, which filter elements are prepared from dyes which are diffusible as a function of exposure of the underlying emulsion. In the embodiment shown, the color screen 14 is in contiguous relationship to silver halide emulsion layer 12. It should be understood, however, that various additional layers may be interposed between them or located elsewhere in the photosensitive element so long as they do not interfere with the permeation characteristics of the element by the processing composition and the subsequent transfer of the dyes and silver halide. As shown in FIG. 1, the screen 14 is intermediate the source of exposing radiation and the silver halide emulsion layer.

Figure 2:
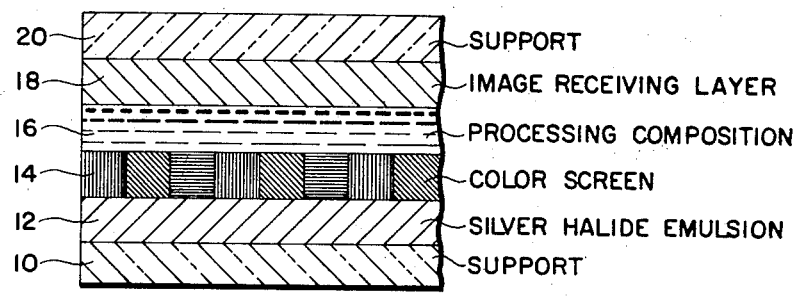
FIG. 2 is a partially schematic, enlarged fragmentary sectional view illustrating a previously exposed photographic product of the present invention.

FIG. 2 illustrates a pre-exposed photosensitive element 30 of FIG. 1 in superposed relationship with image-receiving element 40, with processing composition 16 introduced therebetween. Processing composition 16 is an aqueous alkaline composition containing silver halide solvent and a developing agent adapted to form a reaction product with exposed silver halide in layer 12 which will react with immobile dye in the color screen 14 to render it mobile and diffusible in the processing composition so that it can diffuse to the adjacent image-receiving layer 18 which preferably contains mordant sites for the dye and silver precipitating nuclei. Support 20 is any suitable dimensionally stable material and is preferably transparent.

Subsequent to substantial dye and silver halide transfer, image-receiving element 40 is preferably separated from photosensitive element 30. The novel product of the present invention is particularly suited for use in forming color transparencies and also motion pictures. In FIG. 2, the processing composition is illustrated as being distributed between image-receiving element 40 and photosensitive element 30, but it should be understood that it could be introduced to the composite film structure through either or both of supports 10 and 20. In such a situation, care must be taken that no processing composition impermeable layer is located in the film unit which would interfere with the permeation of the processing composition.

As stated above, any suitable compounds may be used for the dyes in the color screen so long as they will function to filter the desired wavelength electromagnetic radiation when in the screen, and will react, as a function of exposure and development of the underlying silver halide to provide a mobile and diffusible moiety which will transfer the dyeable image-receiving layer. The preferred compounds are set forth in U. S. Pat. Nos. 3,443,939; 3,443,940; and 3,449,943.

Other suitable compounds are nondiffusible coupler compounds which release diffusible dyes on coupling with the oxidation product of color developing agents. Such compounds are set forth in U. S. Pat. Nos. 3,227,550; 3,227,552; 3,227,554; and 3,243,294. Particularly preferred compounds include 1-hydroxy-4-(4-[1(4-sulfophenyl)-3-methyl-4-pyrazol-5-onylazo]-3-sulfophenylazo)-N-[8-(2,4-di-tert-amylphenoxy)butyl]-2-naphthamide disodium salt and 1 hydroxy-4-(4-[3-methyl-4-(1,5-disulfo-3-naphthylazo)-1-pyrazol-5-onyl]phenylazo)-N-[8-3-pentadecylphenoxy)butyl]-2-naphthamide disodium salt with a phenylene diamine developer.

Although the color screen may be produced by methods known to the art, it is preferred that the method and apparatus described in U. S. Pat. No. 3,032,008 is preferred. In the indicated patent, the described device extrudes a plurality of streams of fluid dye composition in a series of line elements of alternating colors to provide the desired dye lines in submacroscopic width in screen orientation.

An alternative method is disclosed in U. S. Pat. No. 2,983,606 wherein a substrate is sequentially embossed to provide spaced apart sections or grooves and then dyes are doctored therein to provide the screen arrangement of the dyes.

Preferably, a protective layer, permeable to processing composition, is applied over the color screen.

Supports 10 and 20 may comprise any of the various types of opaque or transparent rigid or flexible supports, for example, glass, polymeric films or both the synthetic type and those derived from naturally occurring products, etc. Especially suitable materials, however, comprise flexible transparent synthetic polymers such as polymethacrylic acid methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetate-butyrate, or acetate propionate; polycarbonates; polystyrenes; and the like.

As examples of materials, for use as the image-receiving layer, mention may be made of solution dyeable polymers such as nylon as, for example, N-methoxymethyl polyhexamethylene adipamide; partially hydrolyzed polyvinyl acetate; polyvinyl alcohol with or without plasticizers; cellulose acetate with filler as, for example, one-half cellulose acetate and one-half oleic acid; gelatin; and other materials of a similar nature. Preferred materials comprise polyvinyl alcohol or gelatin containing a dye mordant such as poly-4-vinyl-pyridine, as disclosed in U. S. Pat. No. 3,148,061 and the partial acetal of polyvinyl alcohol and trialkylammonium benzaldehyde quaternary salt as disclosed in U. S. Pat. No. 2,239,337.

In general, silver precipitating nuclei comprise a specific class of adjuncts well known in the art as adapted to effect catalytic reduction of solubilized silver halide specifically including heavy metals and heavy metal compounds such as the metals of Groups IB, IIB, IVA, VIA, and VIII and the reaction products of Group IB, IIB, IVA, and VIII metals with elements of group VIA, and may be effectively employed in a relatively low concentration in the order of about $1 \times 10^{-6}$ moles/ft.$^2$.

Especially suitable as silver precipitating agents are those disclosed in U. S. Pat. No. 2,698,237 and specifically the metallic sulfides and selenides, there detailed, these terms being understood to include the selenosulfides, the polysulfides, and the polyselenides. Preferred in this group are the so-called "heavy metal sulfides." For best results it is preferred to employ sulfides whose solubility products in an aqueous medium at approximately 20° C. vary between $10^{-23}$ and $10^{-30}$, and especially the salts of zinc, copper, cadium and lead. Also particularly suitable as precipitating agents are heavy metals such as silver, gold, platinum and palladium and in this category the noble metals illustrated are preferred and are generally provided in the matrix as colloidal particles.

The present invention will be illustrated in greater detail in conjunction with the following specific example which sets forth a representative fabrication of the film units of the present invention, which however, is not limited to the detailed description herein set forth but is intended to be illustrative only.

A transparent support layer, such as a sheet of polyester, may be coated on one surface with a panchromatically sensitized silver iodobromide emulsion. The thus-formed sheet may then be embossed to provide depressed sections or grooves, in a direction 45° to the longitudinal axis of the sheet. A dispersion of a red dye in gelatin, i.e., a mixture of:

1. 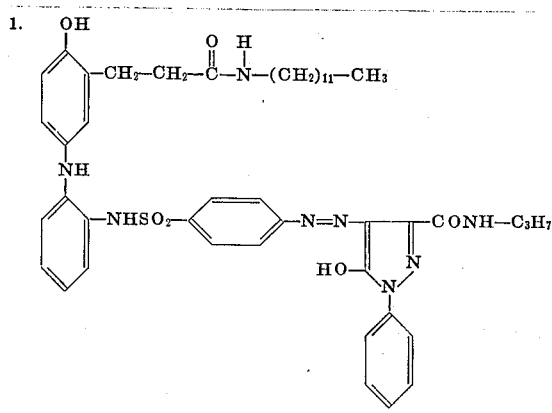

and

2. 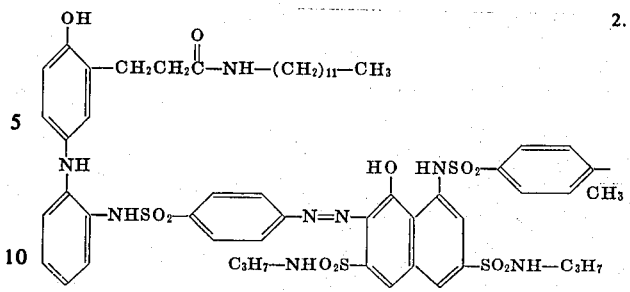

may be then doctored into approximately one third of the grooves according to the technique described in U. S. Pat. No. 2,983,606. Similarly, a green dye:

3. 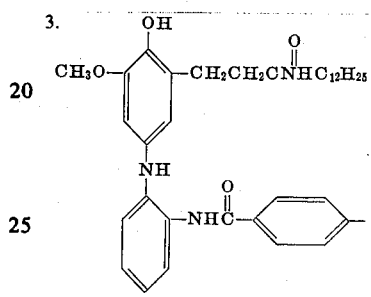

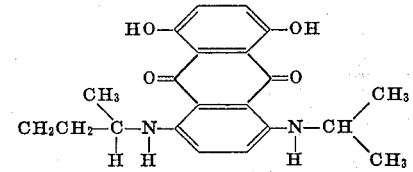

and

1. 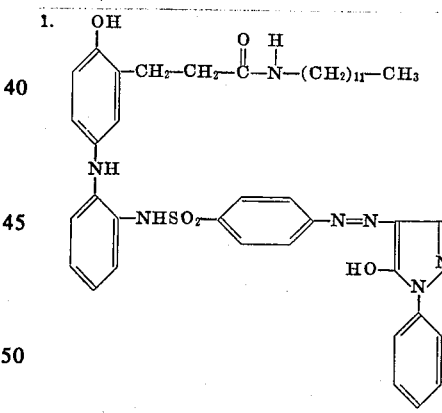

and a blue dye:

2. 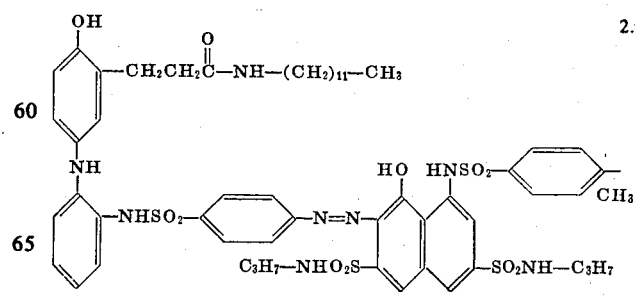

and

3. 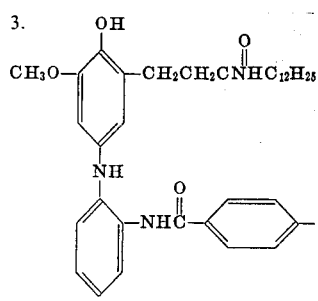

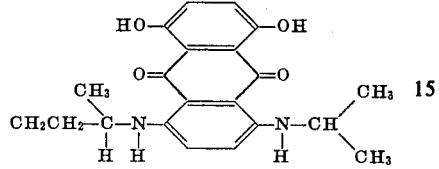

may be applied by the same techniques to provide a series of colored elements in screen pattern.

The film unit, fabricated as detailed above, may be subjected to exposing electromagnetic radiation incident on the color screen, an image-receiving element comprising a transparent polyester support carrying a layer of poly-4-vinylpyridine having dispersed therein copper sulfide in a concentration of $1 \times 10^{-6}$ mgs./ft.$^2$, and developed by contacting the film unit for about 60 seconds with a processing composition comprising 100 cc. of water, 4.9 grams of potassium hydroxide, 3.9 grams of hydroxyethyl cellulose, 4 grams of sodium thiosulfate, and 2 grams of p-methylaminophenol (METOL). The image-receiving element may be separated from the photosensitive element to provide an additive positive color image.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A photographic film unit which comprises a support carrying on one surface a silver halide emulsion layer and an additive multicolor screen, the optical filter units of said screen being formed of dyes which are diffusible as a function of development of said silver halide emulsion and a second support carrying an image-receiving element comprising a dyeable polymer and silver precipitating nuclei.

2. The product as defined in claim 1 wherein said multicolor screen is an additive color screen composed of red, green and blue optical filter elements.

3. The product as defined in claim 1 wherein said silver halide emulsion is panchromatically sensitized.

4. The product as defined in claim 1 wherein said dyes are adapted to react with an oxidation product produced by development of exposed silver halide to provide a diffusible moiety.

5. A product as defined in claim 4 wherein said dyes are capable upon development of exposed silver halide to autoreact intramolecularly to effect ring closure, to provide a moiety diffusible in an alkaline processing composition.

6. The product as defined in claim 4 wherein said red dye comprises compounds of the formulas:

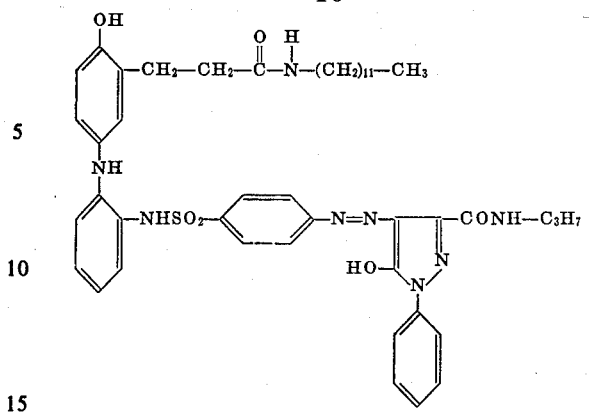

and

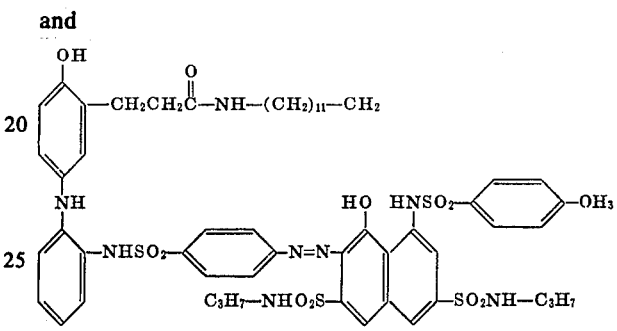

said green dye comprises compounds of the formulas:

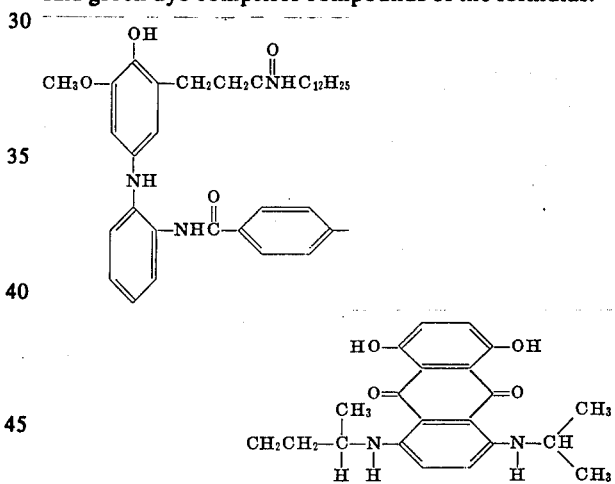

and

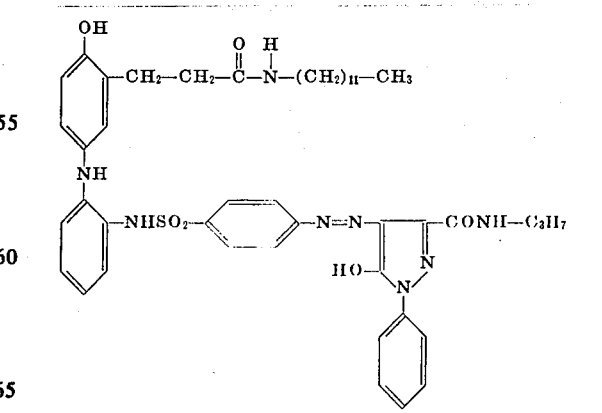

and said blue dye comprises compounds of the formulas:

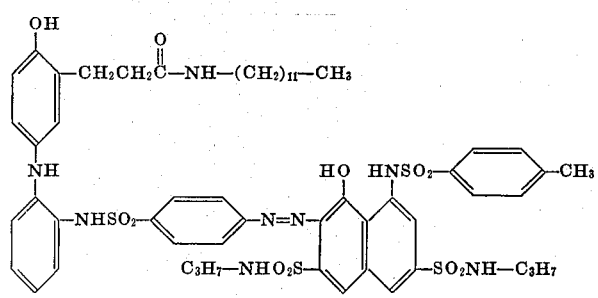

and

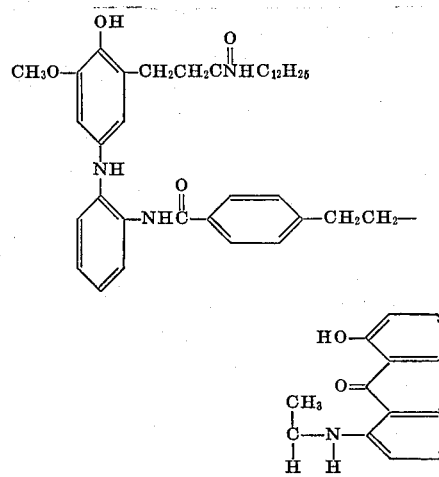

7. A product as defined in claim 1 which includes a layer including a silver halide developing agent intermediate said silver halide emulsion layer and said color screen.

8. A product as defined in claim 6 wherein said silver halide developing agent is p-methylaminophenol.

9. A product as defined in claim 1 wherein said silver precipitating nuclei is copper sulfide.

10. A product as defined in claim 1 wherein said dyeable polymer is poly-4-vinylpyridine.

11. A product as defined in claim 9 which includes means for spreading an aqueous alkaline processing composition between said image-receiving element and said silver halide emulsion layer.

12. A process for forming a transfer image in color which comprises the steps of exposing a photographic film unit containing a multicolor screen and a silver halide emulsion layer, the optical film units of said color screen being formed of dyes which are diffusible as a function of development of said silver halide emulsion, from said color screen, contacting said photographic film unit with an aqueous processing composition containing a silver halide solvent and a silver halide developing agent, forming thereby an imagewise distribution of mobile dye as a function of the point-to-point degree of exposure of said silver halide emulsion, transferring by imbibition at least a portion of said imagewise distribution of mobile dye and unexposed silver halide to a superposed image-receiving element, and separating said image-receiving element and said photographic film unit subsequent to said dye and silver halide transfer.

13. The process as defined in claim 11 wherein said color screen is an additive color screen composed of red, green and blue optical filter elements.

14. The process as defined in claim 11 wherein said silver halide emulsion is panchromatically sensitized.

15. The product as defined in claim 12 wherein said dyes are adapted to react with an oxidation product produced by development of exposed silver halide to provide a diffusible moiety.

16. A process as defined in claim 15 wherein said dyes, upon development of exposed silver halide, autoreact intramolecularly to effect ring closure to provide a moiety diffusible in an alkaline processing composition.

17. The process as defined in claim 15 wherein said red dye comprises compounds of the formulas:

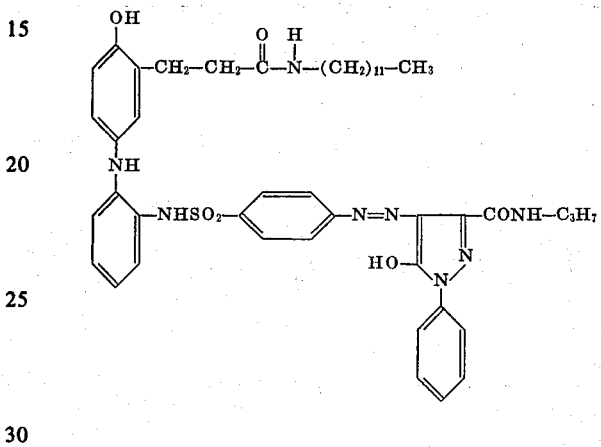

and

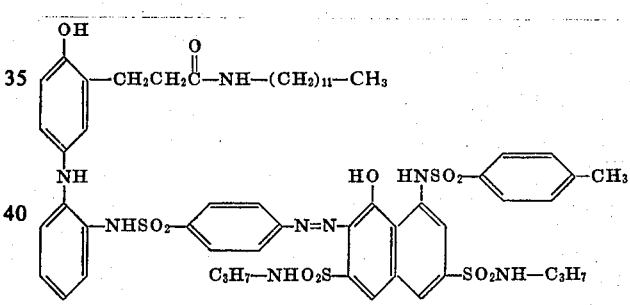

and a green dye comprising compounds of the formulas:

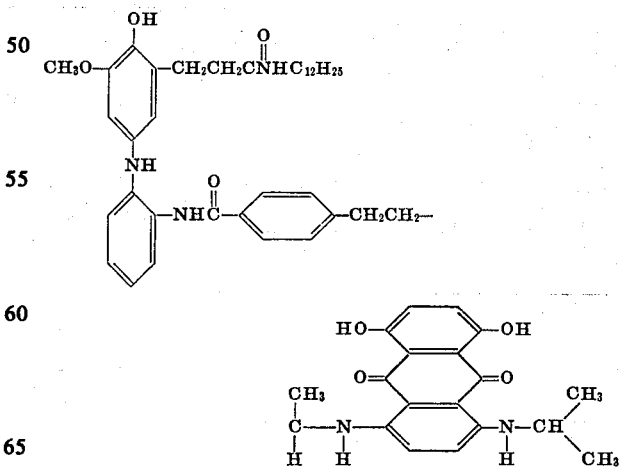

and

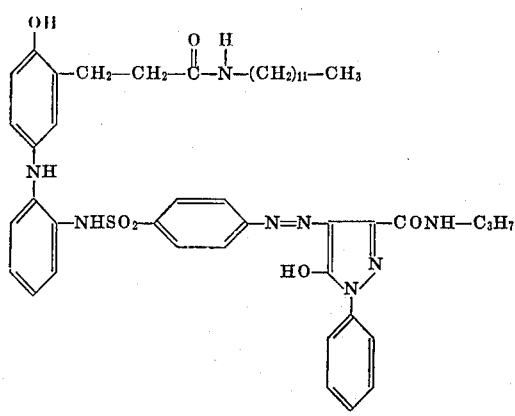

and a blue dye comprising compounds of the formulas:

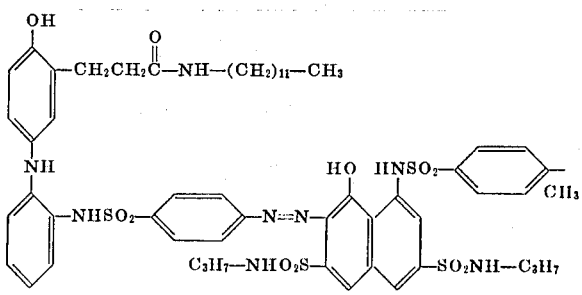

and

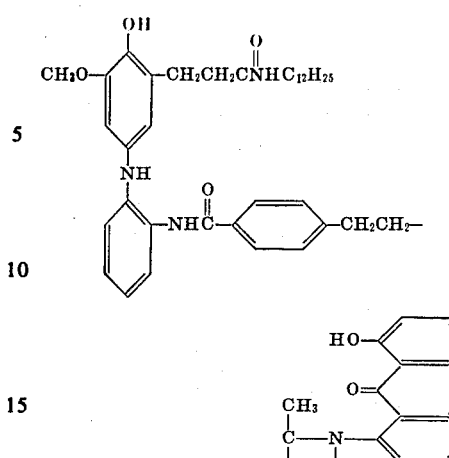

18. A process as defined in claim 12 which includes a layer including a silver halide developing agent intermediate said silver halide emulsion layer and said color screen.

19. A process as defined in claim 17 wherein said silver halide developing agent is methylaminophenol.

20. A process as defined in claim 12 wherein said image-receiving element includes a support carrying on one surface a dyeable polymer having incorporated therein a silver halide precipitating nuclei.

21. A process as defined in claim 18 wherein said silver precipitating nuclei is copper sulfide.

22. A process as defined in claim 18 wherein said dyeable polymer is poly-4-vinylpyridine.

23. A process as defined in claim 18 wherein said support is transparent.

24. An additive color product comprising a polymeric layer containing a multicolor dye image thereon, said dye image being positive in terms of color rendition and negative in terms of brightness, said dye image being modulated by a negative neutral density silver image associated therewith, to provide, by projection, a positive image by additive color synthesis.

* * * * *